United States Patent Office 3,475,426
Patented Oct. 28, 1969

3,475,426
2 - (1,1-DIOXO - 2H - 1,2,4 - BENZOTHIADIAZIN-3-YLTHIO) ACYLACETIC ACID ESTERS AND RELATED COMPOUNDS
Peter H. L. Wei, Upper Darby, and Stanley C. Bell, Penn Valley, Pa., assignors to American Home Products Corporation, New York, N.Y., a corporation of Delaware
No Drawing. Filed Nov. 9, 1967, Ser. No. 681,884
Int. Cl. C07d 93/30
U.S. Cl. 260—243                 9 Claims

ABSTRACT OF THE DISCLOSURE

This invention is concerned with 2-(1,1-dioxo-2H-1,2,4-benzothiadiazin-3-ylthio)acylacetic acid esters and 2 - (3,4 - dihydro - 4 - oxo - 2 - quinazolinylthio)acylacetic acid esters which are useful intermediates in the preparation of compounds which are pharmacologically active.

---

The present invention is concerned with new and novel nitrogen and sulfur containing bicyclic compounds. In particular, this invention is concerned with 2-(1,1-dioxo-2H-1,2,4-benzothiadiazin-3-ylthio)acylacetic acid esters and 2 - (3,4 - dihydro - 4 - oxo - 2 - quinazolinylthio)acylacetic acid esters which are useful intermediates in the preparation of related compounds which are pharmacodynamically efficacious.

The new and novel compounds within the scope of the present invention are depicted by the following formula

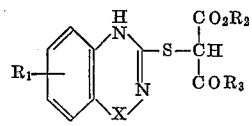

wherein $R_1$ is selected from the group consisting of hydrogen, halogen, lower alkyl and lower alkoxy; $R_2$ and $R_3$ are lower alkyl and X is selected from the group consisting of carbonyl and sulfonyl. The terms "lower alkyl" and "lower alkoxy" are employed herein are meant to include both straight and branched moieties having from about one to about eight carbon atoms.

The new and novel compounds of this invention which are represented by the above formula where X is sulfonyl are described as "2-(1,1-dioxo-2H-1,2,4-benzothiadiazin-3-ylthio)acylacetic acid esters," for example, 2-(6-chloro-1,1 - dioxo - 2H - 1,2,4 - benzothiadiazin - 3 - ylthio)acetoacetic acid, ethyl ester; and 2-(7-methyl-1,1-dioxo-2H-1,2,4-benzothiadiazin-3-ylthio)acetoacetic acid, esters. Alternatively, when X is carbonyl these compounds are named as "2-(3,4-dihydro-4-oxo-2-quinazolinylthio)acylacetic acid, esters," such as, 2-(6-chloro-3,4-dihydro-4-oxo-2-quinazolinylthio)acetoacetic acid, ethyl ester; and 2 - (3,4 - dihydro - 7 - methyl - 4 - oxo - 2 - quinazolinylthio)acetoacetic acid, ethyl ester.

The new and novel compounds of the present invention are prepared by the process which is schematically illustrated as follows:

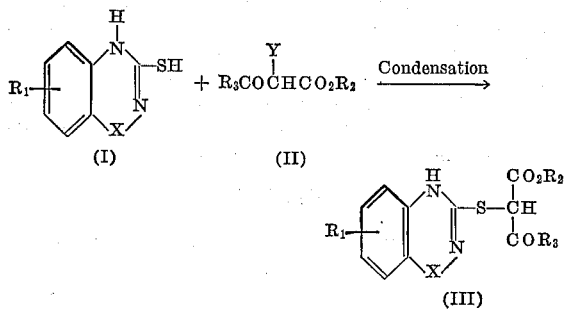

wherein $R_1$, $R_2$, $R_3$ and X are defined as above and Y is halogen. The condensation reaction is effected by contacting an appropriate thiol (I) with an acylacetic acid ester (II), in the presence of an alkali metal hydroxide, in an aqueous alkanol solvent at about 25° C. for a period of about twelve to about twenty-four hours. Preferably, this reaction is conducted in the presence of potassium hydroxide in aqueous ethanol.

When the condensation reaction is complete, the resulting product (III) is separated by standard recovery procedures. For example, the reaction mixture is filtered and the solid is recrystallized from a suitable polar organic solvent, e.g. an alkanol.

The 2H-3-mercapto-1,2,4-benzothiadiazine 1,1-dioxides which are used as starting materials to prepare the 2-(1,1,-dioxo-2H-1,2,4-benzothiadiazin-3-ylthio)acylacetic acid esters of the present invention are described or prepared by the process described by DeStevens et al. in U.S. Patent 2,894,948 issued July 14, 1959. The 3,4-dihydro-4-oxo-2-mercaptoquinazolines which are used as starting materials in the preparation of the 2-(3,4-dihydro-4-oxo-2-quinazolinylthio)acylacetic acid esters of this invention are described or prepared by the process described by H. S. Sachdez et al. in J. Indian Chem. Soc. 32, 647–650 (1955). The 2-haloacylacetic esters employed as the other reactants in the preparation of the compounds of this invention are commercially available or are easily prepared by procedures well known to those skilled in the art of chemistry.

The new and novel compounds of the present invention are useful intermediates in the preparation of pharmacologically efficacious related compounds. In particular, the 2-(1,1-dioxo-2H-1,2,4-benzothiadiazin-3-ylthio)acylacetic acid esters of the present invention are useful intermediates in the preparation of their corresponding 1-alkylthiozolo[2,3-c] [1,2,4]benzothiadiazine-2-carboxylic acid, 5,5-dioxide esters and 2-(α-hydroxyalkylidene)thiazolo [2,3-c] [1,2,4]benzothiadiazin-1(2H)-one, 5,5-dioxide esters. The former compounds are described in cofiled U.S. patent application, Ser. No. 681,902 entitled "1-Alkylthiazolo[2,3-c] [1,2,4]Benzothiadiazine - 2 - Carboxylic Acid, 5,5-Dioxide Esters" which has now been abondoned and replaced by a continuation-in-part U.S. patent application, Ser. No. 704,505, filed on Feb. 12, 1968 of the same title. Therein these compounds are described as possessing utility as antidiarrheal agents in experimental and comparative pharmacology. When these former compounds are orally tested by the procedure described by Leslie and Maxwell in Nature 202:97 (1964) they antagonized the diarrheal effects of oxytremorine for twenty minutes and have a calculated $ED_{50}$ of 30 to 50 mg./kilo. Alternatively, the latter compounds are described in cofiled U.S. patent application, Ser. No. 681,903 entitled "2-(α-Hydroxyalkylidene)Thiazolo[2,3-c] [1,2,4]Benzothiadiazin-1 (2H)-one, 5,5-Dioxide Esters, Related Compounds and the Process for Their Preparation" which has now been abandoned and replaced by a pending continuation-in-part U.S. patent application, Ser. No. 704,582, filed on Feb. 12, 1968 of the same title. Therein, these compounds are described as possessing utility as central nervous system depressants in experimental and comparative pharmacology. These latter compounds are tested by the following procedure:

The compound is administered orally to three mice (14 to 24 grams) at each of the following doses: 400, 127, 40 and 12.7 mg./kg. The animals are watched for a minimum of two hours during which time signs of general stimulation (i.e., increased spontaneous motor activity, hyperactivity on tactile stimulation, twitching), general depression (i.e., decreased spontaneous motor activity, decreased respiration) and autonomic activity (i.e., miosis, mydriasis, diarrhea) are noted. The animals are tested for changes in reflexes (i.e. flexor, extensor) and are rated by use of a pole climb and inclined screen for the presence of sedation-ataxia. The "Eddy Hot-Plate method" [Nathan B. Eddy and Dorothy Leimbach, J. Pharmacol. Exper. Therap. 107, 385 (1953)] is used to test for analgesia. The experiment is terminated by subjecting each animal to a maximal electroshock to test for anti-convulsant activity.

These latter compounds when tested by the above procedure induce decreased motor activity and produce sedative-ataxic effects at 400 mg./kg.

The 2-(3,4-dihydro-4-oxo-2-quinazolinylthio)acylacetic acid esters of the present invention are useful intermediates in the preparation of their corresponding 1-alkyl-5-oxo-5H-thiazolo[3,2-a]quinazoline-2-carboxylic acid esters which are described in cofiled U.S. patent application, Ser. No. 681,904, entitled "1-Alkyl-5-Oxo-5H-Thiazolo [3,2-a]Quinazoline-2-Carboxylic Acid Esters" which has now been abandoned and replaced by a pending continuation-in-part U.S. patent application, Ser. No. 704,519, filed on Feb. 12, 1968 of the same title, wherein said compounds are described as possessing utility as central nervous system depressants in experimental and comparative pharmacology when tested by the above described procedure. These 1-alkyl-5-oxo-5H-thiazolo[3,2-a]quinazoline-2-carboxylic acid esters when tested by this procedure induced decreased motor activity at 12.7 mg./kilo.

The following examples are given by way of illustration.

EXAMPLE I

6 - chloro - 2H - 3 - mercapto - 1,2,4 - benzothiadiazine-1,1-dioxide (20.0 g., 0.0765 m.) is dissolved in 800 ml. of ethanol and 90 ml. water and admixed with a solution of potassium hydroxide (4.28 g., 0.0765 m.) followed by 2-chloroacetoacetic ester (13.0 g., 0.0765 m.) (97 percent). The mixture is stirred at room temperature overnight and then the resulting solid is collected and washed with water. The mother liquor is concentrated and the residue is washed with water. The combined solids are recrystallized from alcohol to give 23.8 g. of 2-(6-chloro-1, 1- dioxo - 2H - 1,2,4 - benzothiadiazin - 3 - ylthio)acetoacetic acid, ethyl ester, M.P. 200–206° C.

*Analysis.*—Calcd. for $C_{13}H_{13}ClN_2O_5S_2$: C, 41.44; H, 3.48; Cl, 9.41; N, 7.44; S, 17.02. Found: C, 41.61; H, 3.80; Cl, 9.6; N, 7.14; S, 16.7.

Similarly, 2-(7-bromo-1,1-dioxo-2H-1,2,4-benzothiadiazin-3-ylthio)acetoacetic acid, methyl ester and 2-(6-fluoro - 1,1 - dioxo - 2H - 1,2,4 - benzothidiazin - 3 - ylthio) propioacetic acid, methyl ester are prepared.

EXAMPLE II

2H - 3 - mercapto - 7 - methyl - 1,2,4 - benzothiadiazine-1,1-dioxide (10.0 g.) is dissolved in 400 ml. of methanol and 45 ml. water. To the solution there is added sodium hydroxide (5.0 g.), followed by 7.5 g. of 2-bromoacetoacetic ester. The mixture is stirred at room temperature for twelve hours and then recrystallized from ethanol to afford 2-(7-methyl-1,1-dioxo-2H-1,2,4-benzothiadiazin-3-ylthio)acetoacetic acid, ethyl ester.

In like manner, 2-(1,1-dioxo-6-propyl-2H-1,2,4-benzothiadiazin-3-ylthio)butyroacetic acid, methyl ester and 2 - (7 - ethyl - 1,1 - dioxo - 2H - 1,2,4 - benzothiadiazin-3-ylthio)acetoacetic acid, butyl ester are prepared.

EXAMPLE III

2H - 3 - mercapto - 6 - methoxy - 1,2,4 - benzothiadiazine-1,1-dioxide (40.0 g.) is dissolved in 1600 ml. of ethanol and 180 ml. water and then admixed with potassium hydroxide (10.0 g.), followed by 26.0 g. of 2-chloroacetoacetic ester. The mixture is stirred at room temperature for twenty-four hours. The resulting solid is collected and washed with water. The mother liquor is concentrated and the residue is washed with water. The combined solids are recrystallized from methanol to yield 2 - (6 - methoxy - 1,1 - dioxo - 2H - 1,2,4 - benzothiadiazin-3-ylthio)acetoacetic acid, ethyl ester.

In the same way, 2 -(6-ethoxy-1,1-dioxo-2H-1,2,4-benzothiadiazin-3-ylthio)propioacetic acid, butyl ester and 2 - (1,1 - dioxo - 8 - propoxy - 2H - 1,2,4 - benzothiadiazin-3-ylthio)butyroacetic acid, methyl ester are synthesized.

EXAMPLE IV

2H - mercapto - 1,2,4 - benzothiadiazine - 1,1 - dioxide (5.0 g.) is dissolved in a mixture of 50 ml. of ethanol and 25 ml. of water. To this solution there is added potassium hydroxide (1.0 g.) followed by 2-chloroacetoacetic acid (8.0 g.). The reaction mixture is then stirred at 25° C. for about twelve hours. Thereafter, the resulting solid is collected, washed with water and recrystallized from ethanol to afford 2-(1,1-dioxo-2H-1,2,4-benzothiadiazin-3-ylthio)acetoacetic acid, ethyl ester.

EXAMPLE V

6 - chloro - 3,4-dihydro-4-oxo-2-mercaptoquinazoline (8.02 g.) is suspended in 300 ml. of ethanol and 20 ml. of water. To the suspension 2.4 g. of potassium hydroxide is added followed by 6.95 g. of 2-chloroacetoacetic ester and the mixture is stirred at room temperature overnight. After removal of some solid the filtrate is concentrated and the residue washed with water to give 10.5 g. of crude material which is recrystallized from ethanol to afford 2- (6 - chloro - 3,4 - dihydro-4-oxo-2-quinazolinylthio)acetoacetic acid, ethyl ester, M.P. 200–205° C. (dec.).

*Analysis.*—Calcd. for $C_{14}H_{13}ClN_2O_4S$: C, 49.34; H, 3.84; Cl, 10.40; N, 8.22. Found: C, 49.61; H, 3.95; Cl, 10.82; N, 8.19.

Similarly, 2-(7-fluoro-3,4-dihydro-4-oxo-2-quinazolinylthio)acetoacetic acid, methyl ester and 2-(6-bromo-3,4-dihydro-4-oxo-2-quinazolinylthio)propioacetic acid, ethyl ester are prepared.

EXAMPLE VI 3,4 - dihydro - 7-methyl-4-oxo-2-mercaptoquinazoline (0.02 m.) is suspended in 150 ml. methanol and 10 ml. of water. To the suspension, sodium hydroxide (.02 m.) is added followed by 2-chloroacetoacetic ester (0.02 m.). The mixture is stirred at room temperature overnight and after removal of some solid the filtrate is concentrated, the residue washed with water and recrystallized from methanol to yield 2-(3,4-dihydro-7-methyl-4-oxo-2-quinazolinylthio)acetoacetic acid, ethyl ester.

In like manner, 2-(3,4-dihydro-4-oxo-7-propyl-2-quinazolinylthio)butyroacetic acid, methyl ester and 2-(6-ethyl - 3,4 - dihydro-4-oxo-2-quinazolinylthio)acetoacetic acid, butyl ester are synthesized.

EXAMPLE VII 3,4 - dihydro - 6-methoxy-4-oxo-2-mercaptoquinazoline (0.04 m.) is suspended in 300 ml. alcohol and 20 ml. of water. To the suspension sodium hydroxide (0.04 m.) is added followed by 2-chloroacetoacetic ester (0.04 m.). The mixture is stirred at room temperature for sixteen hours. After removal of some solid the filtrate is concentrated, the residue washed with water and recrystallized from ethanol to yield 2-(3,4-dihydro-6-methoxy-4-oxo-2-quinazolinylthio)acetoacetic acid, ethyl ester.

In the same manner, 2-(6-ethoxy-3,4-dihydro-4-oxo-2-quinazolinylthio)propioacetic acid, butyl ester and 2-(3,4-dihydro - 4 - oxo - 7-propoxy-2-quinazolinylthio)butyroacetic acid, methyl ester are obtained.

EXAMPLE VIII

Repeating the procedure of Example VII to react 3,4-dihydro-4-oxo-2-mercaptoquinazoline with 2 - chloroacetoacetic ester, there is produced 2-(3,4-dihydro-4-oxo-2-quinazolinylthio)acetoacetic acid, ethyl ester.

What is claimed is:
1. A compound selected from the group consisting of those having the formula:

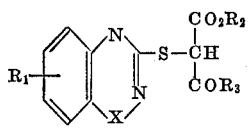

wherein $R_1$ is selected from the group consisting of hydrogen, chloro, bromo, fluoro, lower alkyl and lower alkoxy; $R_2$ and $R_3$ are lower alkyl; and X is selected from the group consisting of carbonyl and sulfonyl.

2. A compound as described in claim 1 which is: 2-(6 - chloro - 1,1-dioxo-2H-1,2,4-benzothiodiazin-3-ylthio) acetoacetic acid, ethyl ester.

3. A compound as described in claim 1 which is: 2-(7-methyl-1,1-dioxo-2H-1,2,4-benzothiadiazin-3-ylthio) acetoacetic acid, ethyl ester.

4. A compound as described in claim 1 which is: 2-(6-methoxy - 1,1 - dioxy-2H-1,2,4-benzothiadiazin-3-ylthio) acetoacetic acid, ethyl ester.

5. A compound as described in claim 1 which is: 2-(1,1-dioxo-2H-1,2,4-benzothiadiazin-3-ylthio)acetoacetic acid, ethyl ester.

6. A compound as described in claim 1 which is: 2-(6-chloro - 3,4-dihydro-4-oxo-2-quinazolinylthio)acetoacetic acid, ethyl ester.

7. A compound as described in claim 1 which is: 2-(3,4-dihydro - 7 - methyl-4-oxo-2-quinazolinylthio)acetoacetic acid, ethyl ester.

8. A compound as described in claim 1 which is: 2-(3,4 - dihydro - 6-methoxy-4-oxo-2-quinazolinylthio)acetoacetic acid, ethyl ester.

9. A compound as described in claim 1 which is: 2-(3,4 - dihydro-4-oxo-2-quinazolinylthio)acetoacetic acid, ethyl ester.

References Cited
UNITED STATES PATENTS 3,304,228    2/1967    Topliss _____ 260—243

NICHOLAS S. RIZZO, Primary Examiner

U.S. Cl. X.R.

424—246